US012776862B2

(12) United States Patent
Gapeyenko et al.

(10) Patent No.: US 12,776,862 B2
(45) Date of Patent: Oct. 27, 2026

(54) FEEDBACK PER CODE BLOCK GROUP

(71) Applicant: NOKIA TECHNOLOGIES OY, Espoo (FI)

(72) Inventors: Margarita Gapeyenko, Espoo (FI); Timo Erkki Lunttila, Espoo (FI); Abolfazl Amiri, Aalborg (DK); Klaus Ingemann Pedersen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 532 days.

(21) Appl. No.: 17/956,437

(22) Filed: Sep. 29, 2022

(65) Prior Publication Data

US 2024/0113812 A1 Apr. 4, 2024

(51) Int. Cl.

| | |
|---|---|
| ***H04L 1/1607*** | (2023.01) |
| *H04L 1/00* | (2006.01) |
| *H04W 72/23* | (2023.01) |
| *H04W 72/54* | (2023.01) |

(52) U.S. Cl.
CPC .......... *H04L 1/1621* (2013.01); *H04L 1/0057* (2013.01); *H04L 1/1614* (2013.01); *H04W 72/23* (2023.01); *H04W 72/54* (2023.01)

(58) Field of Classification Search
CPC ..................................................... H04L 1/1621
See application file for complete search history.

(56) References Cited

U.S. PATENT DOCUMENTS

| | | | | |
|---|---|---|---|---|
| 6,367,045 B1 * | 4/2002 | Khan | H04L 1/1809 714/748 |
| 2018/0367244 A1 * | 12/2018 | Yang | H04L 1/0045 |
| 2018/0368110 A1 * | 12/2018 | Ying | H04L 5/0044 |

FOREIGN PATENT DOCUMENTS

| | | |
|---|---|---|
| EP | 3 681 069 A1 | 7/2020 |

OTHER PUBLICATIONS

Nokia, "Revised SID: Study on ER Enhancements for Nr", 3GPP TSG RAN Meeting #95e, Electronic Meeting, Mar. 17-23, 2022, RP-220285, 5 pages.
3GPP TR 38.838 V17.0.0 (Dec. 2021), 3rd Generation Partnership Project; Technical Specification Group Radio Access Network; Study on XR (Extended Reality) Evaluations for NR (Release 17), 272 pages.
European Search Report issued in corresponding European Patent Application No. 23195913.1—1213 on Feb. 15, 2024.

* cited by examiner

*Primary Examiner* — Joseph D Torres
(74) *Attorney, Agent, or Firm* — BURR & FORMAN LLP

(57) ABSTRACT

Systems, methods, apparatuses, and computer program products for feedback per code block group (CBG). A method may include receiving from a network element, at least one transport block including at least one coding block group. The method may also include determining which of the at least one transport block and the at least one coding block group was correctly or incorrectly received. The method may further include transmitting, based on the determination, a first report which identifies transport blocks of the at least one transport block that was correctly received and incorrectly received. In addition, the method may include, upon determining that at least one of the transport blocks was received incorrectly, transmitting a second report identifying coding block groups of the at least one coding block group that was incorrectly received from the transport blocks that were incorrectly received.

10 Claims, 8 Drawing Sheets

| U | D | D | D | S | U | D | D | D | S | U |
|---|---|---|---|---|---|---|---|---|---|---|
| ... | 7 | 8 | | | Report TBs: 1111 1101 | | | | | Report CBGs of TB 7: 1111 1010 |

FIG. 4

| Event symbol | Event description | Event probability | Codeword $C_1$ |
|---|---|---|---|
| a | No TB in error | (0.9)^3= 73% | 0 |
| b | 1 TB in error | 3*0.1*(0.9)^2=24.3% | 10 |
| c | 2 TBs in error | 3*0.01*(0.9)=2.69% | 110 |
| d | All TBs in error | 0.01% | 111 |

| Event symbol | Event description | Event probability | Codeword $C_3$ |
|---|---|---|---|
| e | 1 CBG in error | 4*10*(0.026)* (0.974)^3= 96% | 0 |
| f | 2 CBGs in error | 6*10*(0.026)^2* (0.974)^2= 3.84% | 10 |
| g | 3 CBGs TBs in error | 4*10*(0.026)^3* (0.974)= 0.06% | 110 |
| h | All CBGs in error | 10*(0.026)^4 < 5e-7 | 111 |

FEEDBACK PER CODE BLOCK GROUP

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for feedback per code block group (CBG).

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, and/or fifth generation (5G) radio access technology or NR access technology. 5G wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include receiving from a network element, at least one transport block including at least one coding block group. The method may also include determining which of the at least one transport block and the at least one coding block group was correctly or incorrectly received. The method may further include transmitting, based on the determination, a first report which identifies transport blocks of the at least one transport block that was correctly received and incorrectly received. In addition, the method may include, upon determining that at least one of the transport blocks was received incorrectly, transmitting a second report identifying coding block groups of the at least one coding block group that was incorrectly received from the transport blocks that were incorrectly received. According to certain example embodiments, a size of the second report may depend on a number of transport blocks that were received incorrectly.

Other example embodiments may be directed to an apparatus. The apparatus may include at least one processor and at least one memory including computer program code. The at least one memory and computer program code may also be configured to, with the at least one processor, cause the apparatus at least to receive from a network element, at least one transport block comprising at least one coding block group. The apparatus may also be caused to determine which of the at least one transport block and the at least one coding block group was correctly or incorrectly received. The apparatus may further be caused to transmit, based on the determination, a first report which identifies transport blocks of the at least one transport block that was correctly received and incorrectly received. In addition, the apparatus may be caused to, upon determining that at least one of the transport blocks was received incorrectly, transmitting a second report identifying coding block groups of the at least one coding block group that was incorrectly received from the transport blocks that were incorrectly received. According to certain example embodiments, a size of the second report may depend on a number of transport blocks that were received incorrectly.

Other example embodiments may be directed to an apparatus. The apparatus may include means for receiving from a network element, at least one transport block including at least one coding block group. The apparatus may also include means for determining which of the at least one transport block and the at least one coding block group was correctly or incorrectly received. The apparatus may also include means for transmitting, based on the determination, a first report which identifies transport blocks of the at least one transport block that was correctly received and incorrectly received. In addition, the apparatus may include means for, upon determining that at least one of the transport blocks was received incorrectly, transmitting a second report identifying coding block groups of the at least one coding block group that was incorrectly received from the transport blocks that were incorrectly received. According to certain example embodiments, a size of the second report may depend on a number of transport blocks that were received incorrectly.

In accordance with other example embodiments, a non-transitory computer readable medium may be encoded with instructions that may, when executed in hardware, perform a method. The method may include receiving from a network element, at least one transport block including at least one coding block group. The method may also include determining which of the at least one transport block and the at least one coding block group was correctly or incorrectly received. The method may further include transmitting, based on the determination, a first report which identifies transport blocks of the at least one transport block that was correctly received and incorrectly received. In addition, the method may include, upon determining that at least one of the transport blocks was received incorrectly, transmitting a second report identifying coding block groups of the at least one coding block group that was incorrectly received from the transport blocks that were incorrectly received. According to certain example embodiments, a size of the second report may depend on a number of transport blocks that were received incorrectly.

Other example embodiments may be directed to a computer program product that performs a method. The method may include receiving from a network element, at least one transport block including at least one coding block group. The method may also include determining which of the at least one transport block and the at least one coding block group was correctly or incorrectly received. The method may further include transmitting, based on the determination, a first report which identifies transport blocks of the at least one transport block that was correctly received and incorrectly received. In addition, the method may include, upon determining that at least one of the transport blocks was received incorrectly, transmitting a second report identifying coding block groups of the at least one coding block group that was incorrectly received from the transport blocks that were incorrectly received. According to certain example embodiments, a size of the second report may depend on a number of transport blocks that were received incorrectly.

Other example embodiments may be directed to an apparatus that may include circuitry configured to receive from a network element, at least one transport block including at least one coding block group. The apparatus may also include circuitry configured to determine which of the at least one transport block and the at least one coding block group was correctly or incorrectly received. The apparatus may further include circuitry configured to transmit, based on the determination, a first report which identifies transport blocks of the at least one transport block that was correctly received and incorrectly received. In addition, the apparatus may include circuitry configured to, upon determining that at least one of the transport blocks was received incorrectly, transmit a second report identifying coding block groups of the at least one coding block group that was incorrectly received from the transport blocks that were incorrectly received. According to certain example embodiments, a size of the second report may depend on a number of transport blocks that were received incorrectly.

Certain example embodiments may be directed to a method. The method may include transmitting to a user equipment, at least one transport block. According to certain example embodiments, the at least one transport block may include at least one coding block group. The method may also include receiving from the user equipment, a first report which identifies transport blocks of the at least one transport block that was correctly received or incorrectly received. The method may further include, when at least one of the transport blocks is received incorrectly, receiving a second report identifying coding block groups of the at least one coding block group that was incorrectly received from the transport blocks that were incorrectly received. In addition, the method may include determining a size of the second report based on the number of transport blocks that were indicated to be received incorrectly in first report.

Other example embodiments may be directed to an apparatus. The apparatus may include at least one processor and at least one memory including computer program code. The at least one memory and computer program code may be configured to, with the at least one processor, cause the apparatus at least to transmit to a user equipment, at least one transport block. According to certain example embodiments, the at least one transport block may include at least one coding block group. The apparatus may also be caused to receive from the user equipment, a first report which identifies transport blocks of the at least one transport block that was correctly received or incorrectly received. The apparatus may further be caused to, when at least one of the transport blocks is received incorrectly, receive a second report identifying coding block groups of the at least one coding block group that was incorrectly received from the transport blocks that were incorrectly received. In addition, the apparatus may be caused to determine a size of the second report based on the number of transport blocks that were indicated to be received incorrectly in first report.

Other example embodiments may be directed to an apparatus. The apparatus may include means for transmitting to a user equipment, at least one transport block. According to certain example embodiments, the at least one transport block may include at least one coding block group. The apparatus may also include means for receiving from the user equipment, a first report which identifies transport blocks of the at least one transport block that was correctly received or incorrectly received. The apparatus may further include means for, when at least one of the transport blocks is received incorrectly, receiving a second report identifying coding block groups of the at least one coding block group that was incorrectly received from the transport blocks that were incorrectly received. In addition, the apparatus may include means for determining a size of the second report based on the number of transport blocks that were indicated to be received incorrectly in first report.

In accordance with other example embodiments, a non-transitory computer readable medium may be encoded with instructions that may, when executed in hardware, perform a method. The method may include transmitting to a user equipment, at least one transport block. According to certain example embodiments, the at least one transport block may include at least one coding block group. The method may also include receiving from the user equipment, a first report which identifies transport blocks of the at least one transport block that was correctly received or incorrectly received. The method may further include, when at least one of the transport blocks is received incorrectly, receiving a second report identifying coding block groups of the at least one coding block group that was incorrectly received from the transport blocks that were incorrectly received. In addition, the method may include determining a size of the second report based on the number of transport blocks that were indicated to be received incorrectly in first report.

Other example embodiments may be directed to a computer program product that performs a method. The method may include transmitting to a user equipment, at least one transport block. According to certain example embodiments, the at least one transport block may include at least one coding block group. The method may also include receiving from the user equipment, a first report which identifies transport blocks of the at least one transport block that was correctly received or incorrectly received. The method may further include, when at least one of the transport blocks is received incorrectly, receiving a second report identifying coding block groups of the at least one coding block group that was incorrectly received from the transport blocks that were incorrectly received. In addition, the method may include determining a size of the second report based on the number of transport blocks that were indicated to be received incorrectly in first report.

Other example embodiments may be directed to an apparatus that may include circuitry configured to transmit to a user equipment, at least one transport block. According to certain example embodiments, the at least one transport block may include at least one coding block group. The apparatus may also include circuitry configured to receive from the user equipment, a first report which identifies transport blocks of the at least one transport block that was correctly received or incorrectly received. The apparatus may also include circuitry configured to, when at least one of the transport blocks is received incorrectly, receive a second report identifying coding block groups of the at least one coding block group that was incorrectly received from the transport blocks that were incorrectly received. In addition, the apparatus may include circuitry configured to determine determining a size of the second report based on the number of transport blocks that were indicated to be received incorrectly in first report.

BRIEF DESCRIPTION OF THE DRAWINGS

For proper understanding of example embodiments, reference should be made to the accompanying drawings, wherein:

FIG. 4 illustrates an example of separate feedback for TBs and CBGs of TBs in error via different physical uplink control channel (PUCCH), according to certain example embodiments.

FIG. 5(*b*) illustrates an example diagram of the steps in the table of FIG. 5(*a*), according to certain example embodiments.

FIG. 6(*b*) illustrates an example diagram of the steps in the table of FIG. 6(*a*), according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for feedback per code block group (CBG) in a multi-physical downlink shared channel (PDSCH). For instance, certain example embodiments may be directed to hybrid automatic repeat request (HARQ) acknowledgement/non-acknowledgment (ACK/NACK) feedback per CBG in multi-PDSCH scheduling with a single downlink control information (DCI).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Figure 1:
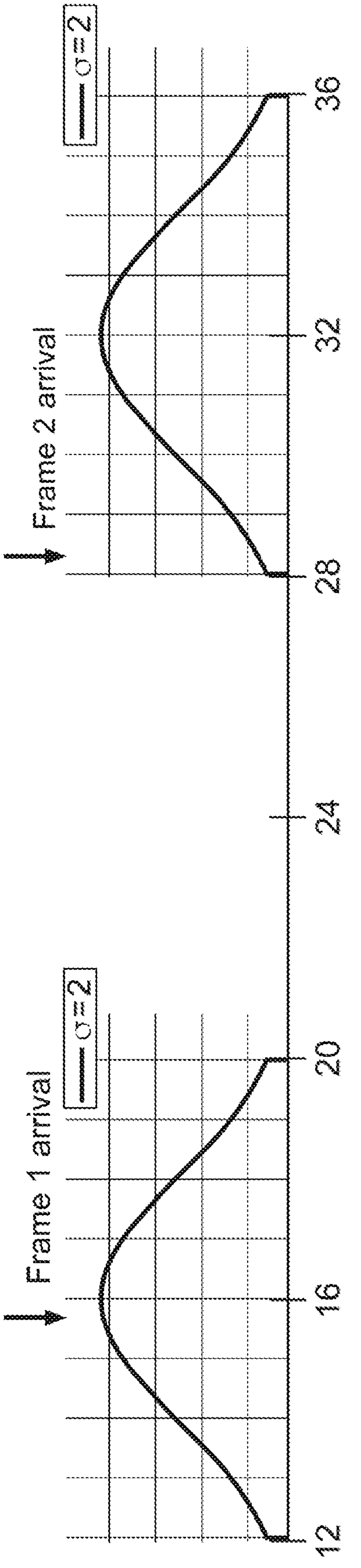
FIG. 1 illustrates an example extended reality (XR) video traffic arrival pattern for 60 fps.

The technical specifications of 3$^{rd}$ Generation Partnership Project (3GPP) describes extended reality (XR) as referring to real-and-virtual combined environments and associated human-machine interactions generated by computer technology and wearables. XR may include various forms such as, for example, augmented reality (AR), mixed reality (MR), virtual reality (VR), and the areas interpolated among them. FIG. 1 illustrates an example XR video traffic arrival pattern for 60 fps. The XR related video traffic may include characteristics such as non-integer periodicity (e.g., 16.6 ms for 60 fps), non-negligible jitter (in a range of [−4, 4] ms), and a stringent packet delay budget (PDB) requirement (10-15 ms). The XR related video traffic may also include characteristics such as varying video frame size with a mean of 62.5 kBytes for 60 fps, and 30 Mbit/s following Truncated Gaussian distribution. Additionally, batch arrival may be comprised of time periods where arrival of downlink (DL) video may be likely, and time periods where arrival of DL video is unlikely (approximated by Normal distribution, as illustrated in FIG. 1).

3GPP specifications also describe multi-PDSCH scheduling with a single DCI. For instance, multi-physical uplink shared channel (PUSCH)/PDSCH scheduling with a single DCI may involve a single DCI that schedules multiple consecutive PDSCHs. The time domain resources may be indicated with a row of a preconfigured set of multiple start symbol and allocation length indicator value (SLIV) allocations. Further, a new data indicator (NDI) and redundancy version (RV) (1 bit) may be signaled per transmission time interval (TTI). In some cases, both slot/mini-slot allocations may be supported with multi-PUSCH/PDSCH scheduling with a single DCI, and subcarrier spacing (SCS) may be supported for multi-PDSCH scheduling at 120 kHz (FR-1/2), 480 kHz (FR2-2), and 960 kHz (FR2-2). For multi-PUSCH scheduling SCS scheduling, SCSs 15 kHz, 30 kHz, and 60 kHz may also be supported in FR1.

As described herein, certain example embodiments may involve CBG-based HARQ operation. In this type of operation, a transport block (TB) may be organized into multiple code blocks (CBs). In some instances, the maximum size of a CB may be 8448 bits, and the CBs may be grouped into CBGs. For each received TB, a receiver may provide feedback to indicate which CBGs are in error, and the erroneously received CBGs may be retransmitted by a transmitter. For the transmission of large TBs for XR use cases, there may be 8 CBGs per TB. The maximum number of CBGs per TB may be configurable as $N \in \{2, 4, 6, 8\}$ for the PDSCH, expressed with parameter maxCodeBlockGroupsPerTransportBlock as included in DCI format 1_1 that may be used in 3GPP Rel-17 for CBG-based PDSCH transmissions.

With the consideration of the characteristics of XR data traffic with large payloads, the retransmission of the entire TB when there is an error may not be the best solution. Thus, a CBG-based Re-Tx may be considered as an alternative option for XR use cases. Moreover, in some cases, one video frame may be conveyed via multiple slots due to its large frame size. Thus, multi-PDSCH scheduling with a single DCI may be considered as a viable approach since it may reduce the DCI overhead, and decrease the power consumption due to reduced PDCCH monitoring occasions.

Although adding a CBG-based indication for multi-PDSCH scheduling with a single DCI may be beneficial for XR use cases, an issue may arise involving the size of the HARQ ACK/NACK feedback. For example, when there is a maximum of 8 slots scheduled and 8 CBGs per TB is indicated, 64 bits will be required to convey the information. This feedback may not be transmitted over one PUCCH which eventually may lead to an increased delay for reTx and expired PDB. Some solutions may involve reducing the number of HARQ-feedback bits in case of multi-PDSCH scheduling by applying time domain bundling, where logical and operation may be applied to HARQ-ACKs associated with different TBs. However, certain example embodiments may provide a way to reduce the HARQ ACK/NACK feedback overhead in case of CBG indication and multi-PDSCH scheduling with a single DCI. Certain example embodiments may also provide a way to determine the size of the HARQ ACK/NACK feedback, a way to compress the size of the feedback, and/or a way to determine the PUCCH resources for a second report (per CBG).

Certain example embodiments may focus on signal TB based ACK/NACK, while other example embodiments may be focused on signal CBG based ACK/NACK for the TBs that are in error (i.e., TBs that were incorrectly received). For instance, in certain example embodiments, the size of the HARQ ACK/NACK feedback may be determined when per CBG feedback is transmitted for the TBs that are in error.

According to certain example embodiments, the size of the HARQ ACK/NACK feedback may be determined when per CBG feedback is transmitted for the TBs that are in error. According to some example embodiments, the size of the second report may be based on a predefined cap, where if the cap is exceeded, the second report (per CBG for TBs in error) is not transmitted. According to other example embodiments, the size of a joint report may be based on the number of TBs scheduled, and the calculated maximum number of TBs in error using a block error rate (BLER) target. According to further example embodiments, to determine the size of the HARQ ACK/NACK feedback, the feedback may be compressed based on a basic coding principle, which is further described herein.

In certain example embodiments, PUCCH resources may be determined for the second (per CBG) feedback report. For instance, in certain example embodiments, the TB-based feedback may be transmitted according to 3GPP Rel-17 rules using the indicated PUCCH resource. Additionally, in some example embodiments, CBG-based feedback may be transmitted in a separate PUCCH instance, which may be determined, for example in the time domain and/or the frequency domain. In the time domain, the PUCCH instance may have a predefined (e.g., configurable) time-offset from the TB-based PUCCH resource. In the frequency domain, each codepoint of a PUCCH resource indicator in the DCI may be associated with a preconfigured PUCCH resource for TB-ACK/NACK and CBG-ACK/NACK. In some example embodiments, the PUCCH resource for the TB-ACK/NACK and the CBG-ACK/NACK may be configured independently, or may be the same for both.

Figure 2:
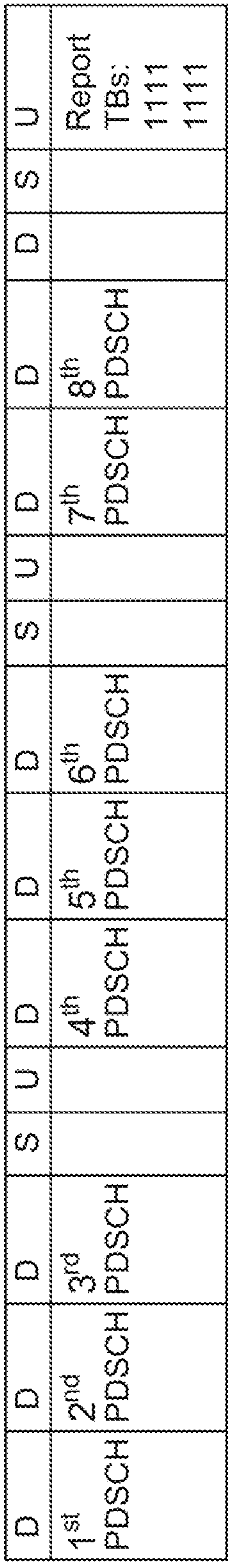
FIG. 2 illustrates an example of where all the transport blocks (TBs) are correctly received, according to certain example embodiments.

According to certain example embodiments, the TB-specific HARQ feedback (i.e., 1 bit per TB), and the CBG-specific HARQ feedback may be provided separately. More specifically, in some example embodiments, the CBG-specific HARQ feedback may be provided for the TBs for which NACK was reported. For instance, on a first PUCCH instance, in a first report, N-bit TB-based ACK/NACK may be provided, where "1" is ACK, and "0" is NACK. On a second PUCCH instance, a second report may provide CBG-based HARQ-ACK feedback for the TBs for which NACK was reported in the first report. For instance, FIG. 2 illustrates an example of where all the TBs are correctly received, according to certain example embodiments. Specifically, FIG. 2 illustrates various slots including, for example, DL slots (D), UL slots (U), and special slots S. In this example, since all the TBs are correctly received, there is no need for the CBG-based feedback.

As illustrated in FIG. 2, the first report may be equal to 1111 1111, where all the TBs are correctly received, and there is no need to send the second report with CBG-based HARQ feedback. However, in another example, the first report may equal to 111 1010, where TBs #6 and #8 are received incorrectly. In this example, the second report may be transmitted in another PUCCH instance to report the CBG-based HARQ feedback for TBs #6 and #8. In certain example embodiments, assuming maxCodeBlock-GroupsPerTransportBlock=8, additional bits 1011 111 (CBGs in TB #6) 1111 0111 (CBGs in TB #8) may be reported, where 0 indicates that a given CBG was not received correctly. In some example embodiments, the size of the HARQ-ACK codebook (i.e., the number of bits) of the second report may depend on the number of NACKs reported in the first report. Assuming that each TB includes 8 CBGs, the size of the second report may be determined by 8*(the # of NACKs in the first report).

According to certain example embodiments, the size of the second report (per CBG) may also depend on additional factors. For instance, in some example embodiments, the size of the second report (per CBG) may depend on a predefined cap for the size of the second report such that if the cap is exceeded, the second report is not transmitted. In this case, the cap may be defined, for example, based on the number of NACKs reported in the first report. If the NACK is reported for more than, for example, 75% of the TBs (or, for example, 75% of the CBGs are received erroneously), the second PUCCH report may be dropped as its size might become excessively large, and many of the CBGs may need to be retransmitted.

Alternatively, in other example embodiments, the cap may be defined in terms of a number of bits in the second report. For example, if the size of the second report exceeds X bits (where X may be, for example, a configurable parameter of 50 bits), the second report may not be transmitted. In other example embodiments, the CBGs may be bundled in case the cap for the report size is exceeded. For example, assuming 8 TBs with NACKs resulting in 64 bits with 8 CBGs/TB, if the cap is, for example 50 bits, bundling (logical AND operation) of the HARQ-ACKs for each two consecutive CBGs may be applied. When the bundling is applied, the number of CBGs may be effectively reduced to 4, and the size of the second report may be reduced to 8*4=32 bits.

Figure 3:
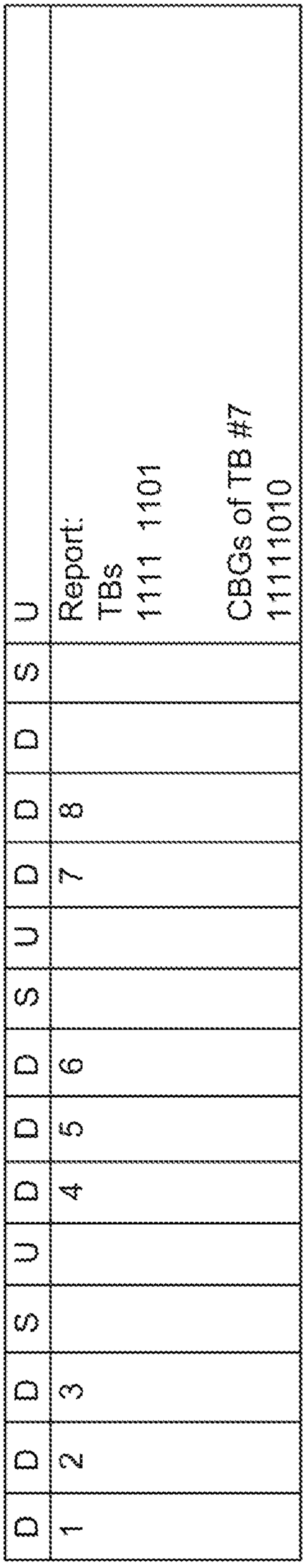
FIG. 3 illustrates an example of joint feedback for TBs and code block groups (CBGs) for failed TBs in one physical uplink shared channel (PUSCH), according to certain example embodiments.

According to certain example embodiments, another factor that may affect the size of the second report may be sending a joint feedback with a single PUCCH for both TB ACK/NACK and CBGs for failed TBs. FIG. 3 illustrates an example joint feedback for TBs and CBGs for failed TBs in one PUSCH, according to certain example embodiments. In the example of FIG. 3, the size of the codebook may be 8 bits (per TB)+8 bits (8 CBGs of one TB). However, in other instances, the size of the codebook may not be known in advance as the number of failed TBs may be different. From a BLER target, it may be possible to calculate the maximum number of failed TBs from the number of scheduled TBs with a single DCI. For instance, the codebook size may represent a number of TBs scheduled+the number of max TBs in error based on an error probability of, for example, 10%. In certain example embodiments, when all of the TBs are correctly received, ACKs may be sent for CBGs for the number of predicated TBs with an error. Additionally, in some example embodiments, if more TBs are received with an error than predicted, the rest of the CBG-based feedback may be sent for the TBs in error with the second report. In certain example embodiments, the order of per CBG indication may follow the order of TBs that are in error.

FIG. 4 illustrates an example separate feedback for TBs and CBGs of TBs in error via different PUCCH, according to certain example embodiments. In some example embodiments, PUCCH resources may be determined for the second report (per CBG). For instance, the TB-based feedback may be transmitted following the 3GPP Rel-17 rules, using the indicate PUCCH resource (the indication may be in the DL assignment scheduling the multiple PDSCH TBs). In other example embodiments, the CBG-based feedback may be transmitted in a separate PUCCH instance, which may be determined, for example, in the time domain (FIG. 4) having a predefined (e.g., configurable) time-offset from the TB-based PUCCH resource, and/or in the frequency domain. In the frequency domain, each codepoint of the PUCCH resource indicator in the DCI may be associated with a preconfigured PUCCH resource for TB-ACK/NACK, and CBG-ACK/NACK, which may be configured independently, or be the same for both.

According to certain example embodiments, HARQ feedback may be compressed, and the report of such feedback may be sent after all slots of scheduled TBs have been received. Due to an uneven probability of ACK/NACK among TBs and among CBGs of the TBs, these probabilities may be used to design a more efficient HARQ feedback that requires less number of bits. In certain example embodiments, this type of compressed feedback may be based on a basic coding principle of using less bits for the most probable events, and using more bits for less probable events.

In certain example embodiments, to apply the coding principle, the probability of TB failure may be variable, and may depend on the BLER target (could be 0.1 or 10e-5 depending on the 5QI). Thus, it may be likely that all the TBs receive ACK. Further, it may be likely that of all the TBs, there is only one TB that failed, and it may be very unlikely to have more than one TB failing.

According to certain example embodiments, when applying the coding principle, within one TB, the probability of different number of CBG failures may be different as well. For instance, if the transport block error rate (TBLER) target is 10%, the error probability of having only one CBG fail may be around 95%. Thus, less bits may be assigned to the case of only one CBG failing (because it is the most probable case), and more bits may be assigned for the cases of more than one CBG failure. With these two points, certain example embodiments may provide a multi-level coding procedure that is a simplified version of Huffman codes.

For instance, in certain example embodiments, the multi-level coding procedure may involve a probability calculation phase. In this phase, the input may be a BLER target, a number of scheduled TBs N, and/or a number of CBGs per TB M. The calculation may be done to evaluate the probability of first, no TB in error, 1 TB in error, and so on. Then, when there is at least one TB with NACK, different probabilities of having 1, 2, . . . , M failed CBGs may be calculated based on a nominal TBLER target.

According to certain example embodiments, the multi-level coding procedure may also include a HARQ feedback coding phase. In this phase, the input may include probabilities of 1, . . . N TB and 1, . . . M CBG failure. Additionally, the multi-level coding procedure may include a TB-level code where a Huffman coding procedure may be performed to indicate the TB-based HARQ feedback. The Huffman coding may generate $C_1$ bits for indicating the number of TBs in error, and $C_2$ bits to indicated failed TB indices (if there is any) corresponding to multiple TBs that are scheduled together starting from #1 TB to #N TB.

In certain example embodiments, the multi-level coding procedure may further include a CBG-level code where a Huffman coding procedure may be performed to indicate the CBG-based HARQ feedback. This coding may generate $C_3$ bits for indicating the number of CBGs in error, and $C_4$ bits to indicate failed CBG indices (if there is any) corresponding to multiple CBGs within each TB with an index starting at #1 for the first CBG to #M for the last CBG within each TB. In other example embodiments, the multi-level coding procedure may further include a final codeword where the final feedback may be the concatenation of all the codewords as $C_1$, $C_2$, $C_3$, $C_4$ which may give full information of multi-PDSCH HARQ feedback.

According to certain example embodiments, the multi-level coding procedure may also include the Huffman coding scheme. For instance, given a sequence of n events, $x_1$, $x_2$, . . . , $x_n$, with probabilities $p_1 \geq p_2 \geq \ldots \geq p_n$, the algorithm may include a step of shrinking the events and extending the code.

In certain example embodiments, shrinking of the events may include constructing a tree by connecting two child nodes of $x_{n-1}$, $x_n$ to a new parent node $y_{n-1}$ with probability of $p_{n-1}+p_n$, and re-sort the events such as the sequence of events having non-increasing probabilities. This step may be continued until all the events shrink into two events, and the tree is completed.

In other example embodiments, extending the code may be accomplished by assigning a 0 (or 1) to each branch on top, and assigning a 1 (or 0) to each branch on the bottom. This may be continued until all branches are assigned. Then, the corresponding code for each event may be the resulting code starting the parent node $y_1$ up until that specific node.

Figures 5A, 5B:
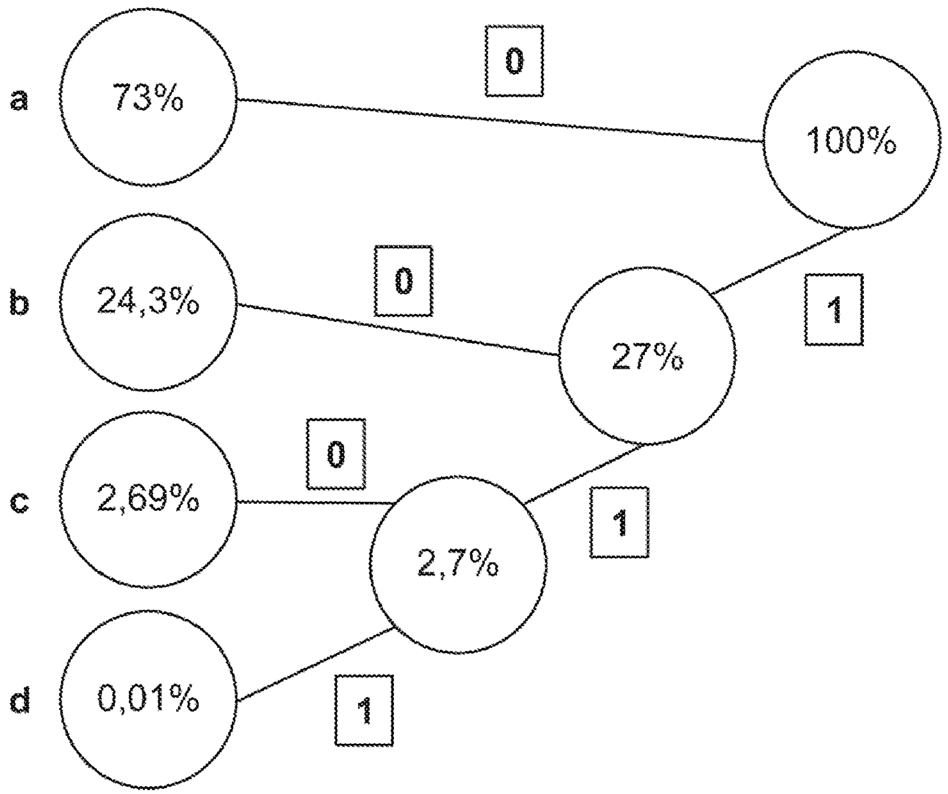
FIG. 5(*a*) illustrates a table of steps as applied with respect to TBs, according to certain example embodiments.

For example, a scenario may be assumed where there are 3 TBs scheduled with one DCI, each BLER target of 10% (i.e., each TB having a BLER of 10%) and 4 CBGs (N=3, M=4). According to certain example embodiments, the BLER may be used to determine the modulation and coding scheme (MCS) index of that TB. FIG. 5(*a*) illustrates a table of the steps above as applied to this example with respect to TBs, according to certain example embodiments. FIG. 5(*b*) illustrates an example diagram of the steps in the table of FIG. 5(*a*), according to certain example embodiments.

As illustrated in FIG. 5(*a*), with BLER=10%=0.1 for each TB, the probability of a successful TB is 1−0.1=0.9. Then, event (a) may be for no TB in error case where the probability of this event is (0.9)^3=0.73 (all three TBs are correctly received). Similarly, using binomial distribution calculations, for event (b), when only 1 TB is in error, the probability is [2 TB correct] (0.9)^2*[1 TB in error]0.1*[permutation of failed TBs]3=24.3%. The remaining probabilities may be similarly calculated.

For the codeword assignment, the method may start by constructing a graph as shown in FIG. 5(*b*), where the left most nodes represent the probability of each of the events (a) to (d). Then, at each step, the two lowest probability nodes are superposed to make a new node with a sum probability of the both nodes. These steps may be repeated until probability 1 (100%) node is reached. Next, the codeword assignment may be done as follows: for each node, assign (0) for the upper edge and assign (1) for the lower edge. This process may be continued until all edges in the graph are numbered. For each event, the codeword may be equal to the superposed codeword of all the edges form node (100%) to that specific event.

Figures 6A, 6B:
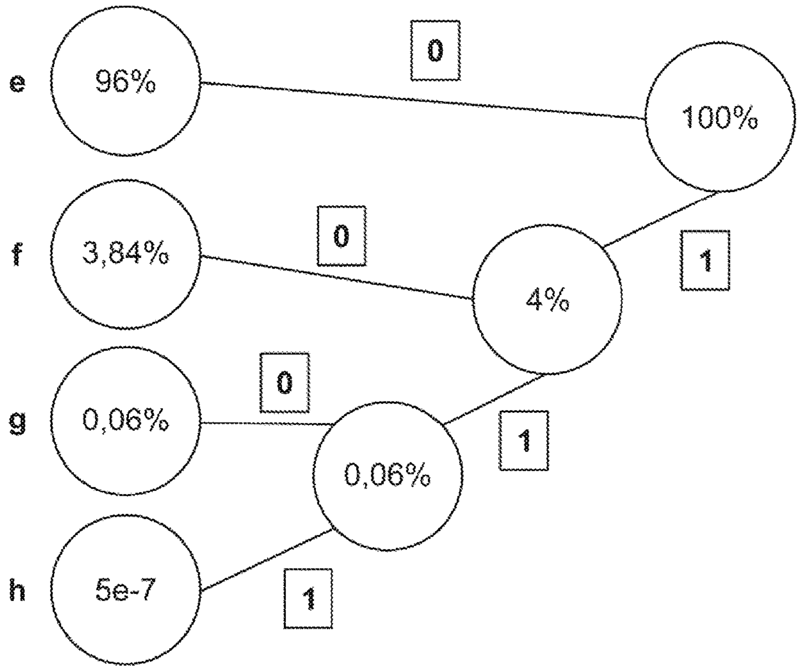
FIG. 6(*a*) illustrates a table of steps with respect to CBGs, according to certain example embodiments.

Additionally, FIG. 6(*a*) illustrates a table of the steps above as applied to this example with respect to CBGs, according to certain example embodiments, and FIG. 6(*b*) illustrates an example diagram of the steps in the table of FIG. 6(*a*), according to certain example embodiments. As illustrated in FIG. 6(*a*), the event probabilities and the codeword $C_3$ may be calculated in a similar manner as that described above with respect to FIGS. 5(*a*) and 5(*b*). Additionally, as illustrated in FIG. 6(*b*), the percentages of 0.06%, 4%, and 100% may be determined in a similar manner as that described above with respect to FIGS. 5(*a*) and 5(*b*).

According to certain example embodiments, for the calculation of $C_2$ and $C_3$, the index of the failed TBs and CBGs may be indicated, respectively. In this situation, there may be three numerical cases. One numerical case may be where all the TBs are received correctly. In this case, feedback may be 0 (with probability 73%). Another numerical case may be where only TB1 is in error with CBG 3 with NACK. In this case, $C_1$=10, $C_2$=01, $C_3$=10, and $C_4$=10. Here, the feedback may be 10011010 (with a probability of 24.3%). A third numerical case may include TB2 and CBG3, and TB3 and CBG1 in error. Here, $C_1$=110, $C_2$=1001, $C_3$=1010, and $C_4$=1001. The feedback in this case may be 110100110101001 (with a probability of 2.69%).

With regard to the probabilities 73%, 24.3%, and 2.69% described above, with BLER=10%=0.1 for each TB, the probability of a successful TB is 1−0.1=0.9. Then, event (a) is for no TB in error case where the probability of this event is (0.9)^3=0.73 (all three TBs are correctly received). Similarly, using binomial distribution calculations, for event (b) when only 1 TB is in error, the probability may be [2 TBs correct](0.9)^2*[1 TB in error] 0.1*[permutation of failed TBs]3=24.3%. For the case of 2 failed TBs, the probability may be [1 TB correct](0.9)*[2 TBs in error](0.1)^2*[permutation of failed TBs]3=2.69%.

In certain example embodiments, the average feedback size for a compressed scheme may be lower than the current specification's size and basic solution described herein. For instance, the current specification size may be M*N, where for each of the N TBs, M bits are sent in feedback that makes N*M bits in total. Further, there may be a compressed HARQ feedback solution that uses graphs and coding to reduce the overhead using event probabilities. As a numerical example, with the same parameters of N=3, M=4, and BLER target=10%, the feedback size may be without compression, which equals M*N=12 bits. Additionally, the basic solution's feedback size may equal to N+N*BLER*M=4.2 bits. In this example, the variant solutions feedback (e.g., compressed HARQ feedback) size may be <3 bits.

According to certain example embodiments, the user equipment (UE) may receive a configuration of multi-PDSCH scheduling from a gNB via radio resource control (RRC) signaling. In certain example embodiments, the configuration may include an indication that CBG-based HARQ feedback is applied (e.g., maxCodeBlockGroupsPerTransportBlock). The configuration may also include the PUCCH resources associated with the HARQ feedback for the multiple PDSCHs. In certain example embodiments, the configuration may be indicative of a first PUCCH resource (for HARQ-ACK of TBs), and a second PUCCH resource (for HARQ-ACK of CBGs).

In certain example embodiments, the UE may also receive, on PDCCH, a DL assignment scheduling multiple PDSCH TBs. The DCI may include an indication of the PUCCH resources to be used for HARQ-feedback of the TB-based HARQ-ACK. In other example embodiments, the UE may receive the scheduled PDSCH TBs and attempt to decode them. The decoding may include decoding of the CBs (and CBGs) included in each TB. Additionally, the UE may determine which of the CBs, CBGs, and TBs are received correctly, and report, in a first report, on the first PUCCH resource, HARQ-ACK (ACK or NACK) for each of the TBs scheduled by the DL assignment. The UE may further report, in a second report, on the second PUCCH resource HARQ-ACK for CBGs of the TBs for which NACK is reported in the first report.

According to other example embodiments, it may be possible to determine the number of bits in the second report or joint report (per TB and per CBG in TBs with error). According to some example embodiments, the determination may be performed by both the UE and the gNB such that they have a common understanding on the number of bits. Additionally, the first and the second PUCCH resource may be determined in time/frequency, and HARQ-feedback compression schemes may be associated with the second report. According to certain example embodiments, the first and the second PUCCH resource may be determined by the UE and the gNB such that they may know which resource to use.

Figure 7:
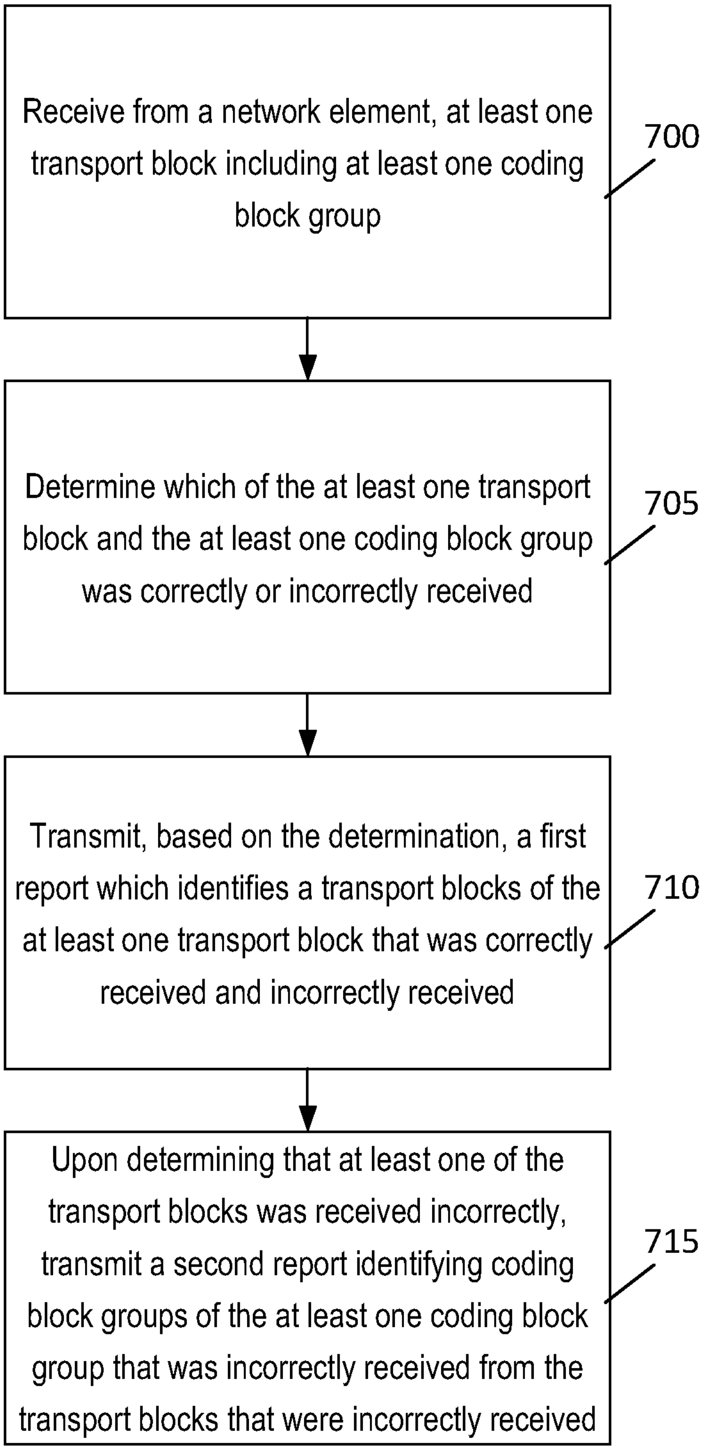
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, or a group of multiple network elements in a 3GPP system, such as LTE or 5G-NR. For instance, in an example embodiment, the method of FIG. 7 may be performed by a UE similar to one of apparatuses 10 or 20 illustrated in FIG. 9.

According to certain example embodiments, the method of FIG. 7 may include, at 700, receiving from a network element, at least one transport block comprising at least one coding block group. The method may also include, at 705, determining which of the at least one transport block and the at least one coding block group was correctly or incorrectly received. The method may further include, at 710, transmitting, based on the determination, a first report which identifies transport blocks of the at least one transport block that was correctly received and incorrectly received. In addition, the method may include, at 715, upon determining that at least one of the transport blocks was received incorrectly, transmitting a second report identifying coding block groups of the at least one coding block group that was incorrectly received from the transport blocks that were incorrectly received. According to certain example embodiments, a size of the second report may depend on a number of transport blocks that were received incorrectly.

According to certain example embodiments, the method may also include receiving from the network element, a configuration of multi-physical downlink shared channel scheduling via radio resource control signaling. According to some example embodiments, the method may further include receiving, as downlink control information, a downlink assignment scheduling of the at least one transport block. In certain example embodiments, the downlink control information may include an indication of physical uplink control channel resources to be used for transmitting of the first report. According to other example embodiments, the physical uplink control channel resources to be used for transmitting the second report may be located later in time than the physical uplink control channel resources to be used for transmitting the first report.

In certain example embodiments, the second report may be transmitted via frequency domain and code domain physical uplink control channel resources. In some example embodiments, the frequency domain and code domain physical uplink control channel resources may be the same as the physical uplink control channel resources to be used for transmitting the first report. In other example embodiments, the size of the second report may be compared with a predefined cap. In further example embodiments, when the predefined cap is exceeded, the second report may not be transmitted, or acknowledgments or non-acknowledgments corresponding to the coding block groups in the second report are bundled so that the size of the second report is reduced to be less than the predefined cap. According to some example embodiments, the first report and the second report may be transmitted as a joint feedback with a single physical uplink control channel.

Figure 8:
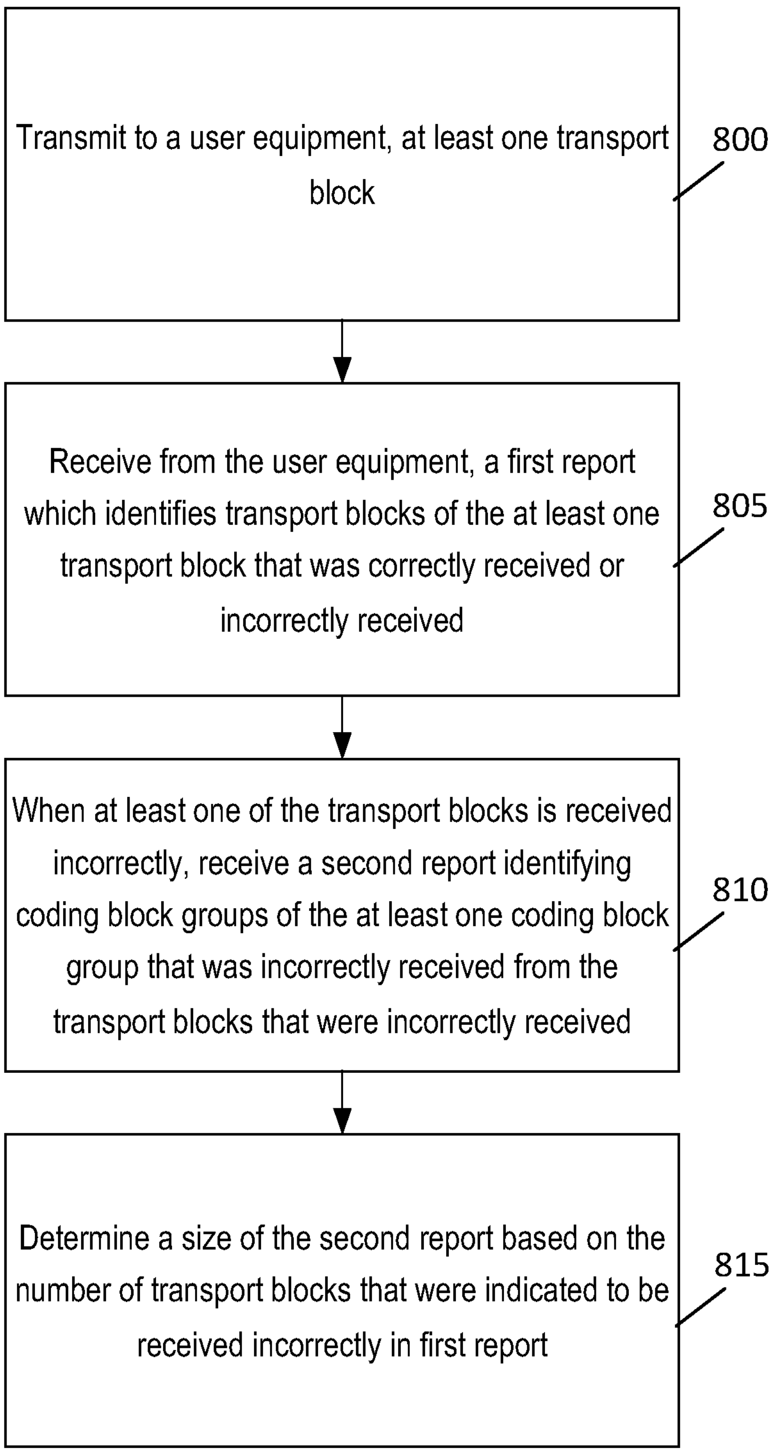
FIG. 8 illustrates an example flow diagram of another method, according to certain example embodiments.

FIG. 8 illustrates an example of a flow diagram of another method, according to certain example embodiments. In an example embodiment, the method of FIG. 8 may be performed by a network entity, or a group of multiple network elements in a 3GPP system, such as LTE or 5G-NR. For instance, in an example embodiment, the method of FIG. 8 may be performed by a network, cell, gNB, or any other device similar to one of apparatuses 10 or 20 illustrated in FIG. 9.

According to certain example embodiments, the method of FIG. 8 may include, at 800, transmitting to a user equipment, at least one transport block. In certain example embodiments, the at least one transport block may include at least one coding block group. The method may also include, at 805, receiving from the user equipment, a first report which identifies transport blocks of the at least one transport block that was correctly received or incorrectly received. The method may further include, at 810, when at least one of the transport blocks is received incorrectly, receiving a second report identifying coding block groups of the at least one coding block group that was incorrectly received from the transport blocks that were incorrectly received. In addition, the method may include, at 815, determining a size of the second report based on the number of transport blocks that were indicated to be received incorrectly in first report.

In certain example embodiments, the method may also include transmitting to the user equipment, a configuration of multi-physical downlink shared channel scheduling via radio resource control signaling. In some example embodiments, the method may further include transmitting to the user equipment, as downlink control information, a downlink assignment scheduling of the at least one transport block. According to certain example embodiments, the downlink control information may include an indication of physical uplink control channel resources to be used for receiving the first report. In other example embodiments, a size of the second report may be compared with a predefined cap.

According to certain example embodiments, when the predefined cap is exceeded, the second report may not be received, or acknowledgments or non-acknowledgments corresponding to the coding block groups in the second report are bundled so that the size of the second report is reduced to be less than the predefined cap. According to some example embodiments, the first report and the second report may be received as a joint feedback with a single physical uplink control channel According to other example embodiments, the second report may be received in a separate physical uplink control channel instance determined in the time domain or in the frequency domain.

Figure 9:
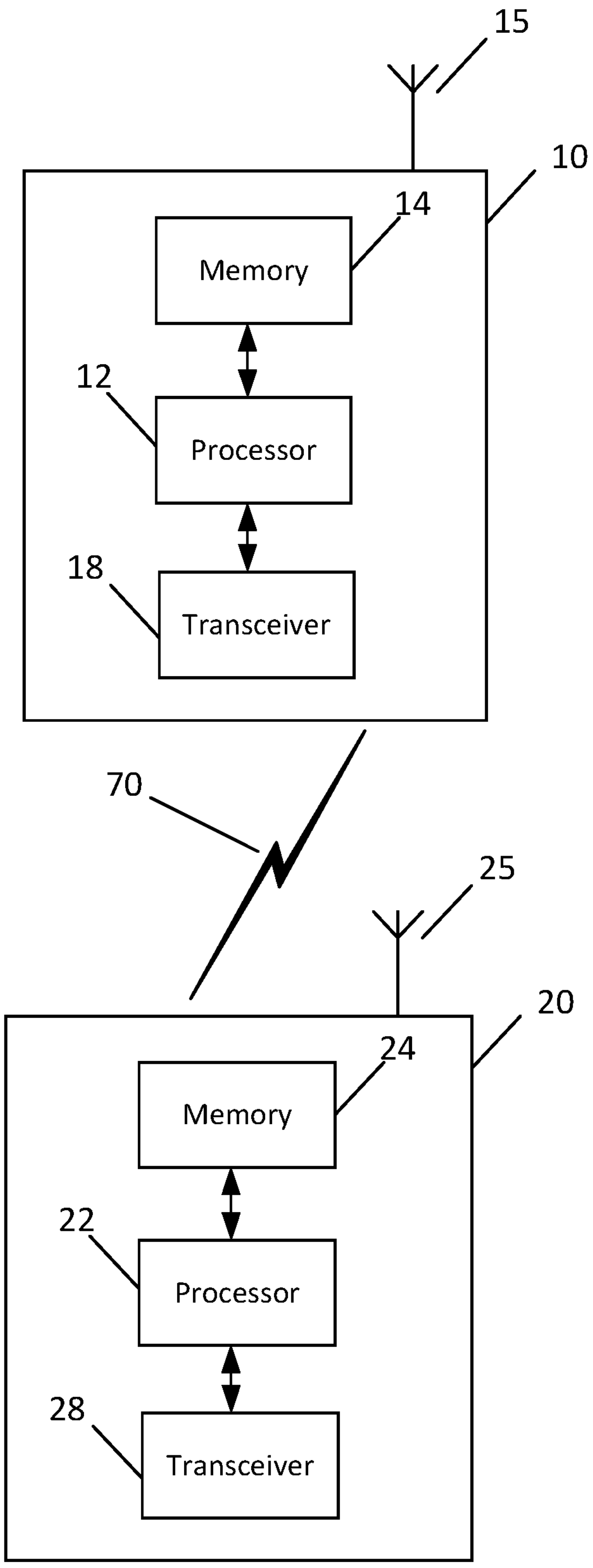
FIG. 9 illustrates a set of apparatuses, according to certain example embodiments.

FIG. 9 illustrates a set of apparatuses 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 9.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9.

As illustrated in the example of FIG. 9, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes and examples illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods and examples illustrated in FIGS. 1-8.

In some example embodiments, apparatus 10 may also include or be coupled to one or more antennas 15 for receiving a downlink signal and for transmitting via an UL from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive from a network element, at least one transport block including at least one coding block group. Apparatus 10 may also be controlled by memory 14 and processor 12 to determine which of the at least one transport block and the at least one coding block group was correctly or incorrectly received. Apparatus 10 may further be controlled by memory 14 and processor 12 to transmit, based on the determination, a first report which identifies transport blocks of the at least one transport block that was correctly received and incorrectly received. In addition, apparatus 10 may be controlled by memory 14 and processor 12 to, upon determining that at least one of the transport blocks was received incorrectly, transmit a second report identifying coding block groups of the at least one coding block group that was incorrectly received from the transport blocks that were incorrectly received. According to certain example embodiments, a size of the second report may depend on a number of transport blocks that were received incorrectly.

As illustrated in the example of FIG. 9, apparatus 20 may be a network, core network element, or element in a communications network or associated with such a network, such as a gNB. It should be noted that one of ordinary skill in the art would understand that apparatus 20 may include components or features not shown in FIG. 9.

As illustrated in the example of FIG. 9, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes and examples illustrated in FIGS. 1-8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods and examples illustrated in FIGS. 1-8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an UL).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to transmit to a user equipment, at least one transport block. In certain example embodiments, the at least one transport block may include at least one coding block group. Apparatus 20 may also be controlled by memory 24 and processor 22 to receive from the user equipment, a first report which identifies transport blocks of the at least one transport block that was correctly received or incorrectly received. Apparatus 20 may further be controlled by memory 24 and processor 22 to, when at least one of the transport blocks is received incorrectly, receive a second report identifying coding block groups of the at least one coding block group that was incorrectly received from the transport blocks that were incorrectly received. In addition, apparatus 20 may be controlled by memory 24 and processor 22 to determine a size of the second report based on the number of transport blocks that were indicated to be received incorrectly in first report.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving from a network element, at least one transport block including at least one coding block group. The apparatus may also include means for determining which of the at least one transport block and the at least one coding block group was correctly or incorrectly received. The apparatus may further include means for transmitting, based on the determination, a first report which identifies transport blocks of the at least one transport block that was correctly received and incorrectly received. In addition, the apparatus may include means for upon determining that at least one of the transport blocks was received incorrectly, transmitting a second report identifying coding block groups of the at least one coding block group that was incorrectly received from the transport blocks that were incorrectly received. According to certain example embodiments, a size of the second report may depend on a number of transport blocks that were received incorrectly.

Certain example embodiments may also be directed to an apparatus that includes means for transmitting to a user equipment, at least one transport block. According to certain example embodiments, the at least one transport block may include at least one coding block group. The apparatus may also include means for receiving from the user equipment, a first report which identifies transport blocks of the at least one transport block that was correctly received or incorrectly received. The apparatus may further include means for when at least one of the transport blocks is received incorrectly, receiving a second report identifying coding block groups of the at least one coding block group that was incorrectly received from the transport blocks that were incorrectly received. In addition, the apparatus may include means for determining a size of the second report based on the number of transport blocks that were indicated to be received incorrectly in first report.

Certain example embodiments described herein provide several technical improvements, enhancements, and/or advantages. For instance, in some example embodiments, it may be possible to reduce delay for receiving HARQ ACK/NACK feedback. In other example embodiments, it may also be possible to reduce overhead associated with a CBG based indication in HARQ ACK/NACK feedback. Further, some example embodiments, it may be possible to make enhanced single-DCI multi-PDSCH scheduling more attractive for XR use cases to offer enhanced radio resource efficiency. In other example embodiments, reduced delay may improve reliability of the transmissions, as more of the erroneously received packets may be corrected (i.e., retransmitted). Additionally, reduced overhead may improve the reliability of the feedback and, for example, allow for larger range for the communication link.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
5GS 5G System
ACK Acknowledgment
AOA Angle of Arrival
AR Augmented Reality
BLER Block Error Rate
BS Base Station
CB Code Block
CBG Code Block Group
CBGTI Code Block Group Transmit Indicator
CSS Common Search Space
DCI Downlink Control Information
DL Downlink
DR Discovery Reader
eNB Enhanced Node B
E-UTRAN Evolved UTRAN
FPS Frames Per Second
gNB 5G or Next Generation NodeB
HARQ Hybrid Automatic Repeat Request
KPI Key Performance Indicator
LA Link Adaptation
LTE Long Term Evolution
MCS Modulation and Coding Scheme
MR Mixed Reality
NACK Negative Acknowledgment
NDI New Data Indicator
NR New Radio
NW Network
PDB Packet Delay Budget
PDCCH Physical Downlink Control Channel
QoS Quality of Service
RRC Radio Resource Control
RV Redundancy Version
SI Study Item
SID Study Item Description
SCS Subcarrier Spacing
SPS Semi-persistent Scheduling
SSSG Search Space Group
TB Transmission Block
UE User Equipment
UL Uplink
USS UE Specific Search Space
VR Virtual Reality
WI Work Item

We claim:

1. An apparatus, comprising:
at least one processor; and
at least one memory storing instructions that, when executed by the at least one processor, cause the apparatus at least to:
receive from a network element, at least one transport block comprising at least one coding block group;
determine which of the at least one transport block and the at least one coding block group was correctly or incorrectly received;
transmit, based on the determination, a first report which identifies transport blocks of the at least one transport block that was correctly received and incorrectly received; and
upon determining that at least one of the transport blocks was received incorrectly, transmit a second report identifying coding block groups of the at least one coding block group that was incorrectly received from the transport blocks that were incorrectly received,
wherein a size of the second report depends on a number of transport blocks that were received incorrectly.

2. The apparatus according to claim 1, wherein the at least one memory stores instructions that, when executed by the at least one processor, further causes the apparatus at least to:
receive, as downlink control information, a downlink assignment scheduling of the at least one transport block, wherein the downlink control information comprises an indication of physical uplink control channel resources to be used for transmitting of the first report.

3. The apparatus according to claim 2, wherein the physical uplink control channel resources to be used for transmitting the second report are located later in time than the physical uplink control channel resources to be used for transmitting the first report.

4. The apparatus according to claim 2, wherein the second report is transmitted via frequency domain and code domain physical uplink control channel resources, and wherein the frequency domain and code domain physical uplink control channel resources are the same as the physical uplink control channel resources to be used for transmitting the first report.

5. The apparatus according to claim 1, wherein the size of the second report is compared with a predefined cap, and wherein when the predefined cap is exceeded, the second report is not transmitted, or acknowledgments or non-acknowledgments corresponding to the coding block groups in the second report are bundled so that the size of the second report is reduced to be less than the predefined cap.

6. A method, comprising:

receiving from a network element, at least one transport block comprising at least one coding block group;

determining which of the at least one transport block and the at least one coding block group was correctly or incorrectly received;

transmitting, based on the determination, a first report which identifies transport blocks of the at least one transport block that was correctly received and incorrectly received; and upon determining that at least one of the transport blocks was received incorrectly, transmitting a second report identifying coding block groups of the at least one coding block group that was incorrectly received from the transport blocks that were incorrectly received, wherein a size of the second report depends on a number of transport blocks that were received incorrectly.

7. The method according to claim 6, further comprising:

receiving, as downlink control information, a downlink assignment scheduling of the at least one transport block, wherein the downlink control information comprises an indication of physical uplink control channel resources to be used for transmitting of the first report.

8. The method according to claim 7, wherein the physical uplink control channel resources to be used for transmitting the second report are located later in time than the physical uplink control channel resources to be used for transmitting the first report.

9. The method according to claim 7, wherein the second report is transmitted via frequency domain and code domain physical uplink control channel resources, and wherein the frequency domain and code domain physical uplink control channel resources are the same as the physical uplink control channel resources to be used for transmitting the first report.

10. The method according to claim 6, wherein the size of the second report is compared with a predefined cap, and wherein when the predefined cap is exceeded, the second report is not received, or acknowledgments or non-acknowledgments corresponding to the coding block groups in the second report are bundled so that the size of the second report is reduced to be less than the predefined cap.

* * * * *